(12) United States Patent
Oura

(10) Patent No.: US 8,229,088 B2
(45) Date of Patent: Jul. 24, 2012

(54) TIME AUTHENTICATION SYSTEM, TERMINAL DEVICE, TIME AUTHENTICATION METHOD FOR CONVERSATION VOICE DATA FOR USE THEREIN, AND PROGRAM THEREOF

(75) Inventor: Shinji Oura, Tokyo (JP)

(73) Assignee: NEC Corporation, Tokyo (JP)

( * ) Notice: Subject to any disclaimer, the term of this patent is extended or adjusted under 35 U.S.C. 154(b) by 1469 days.

(21) Appl. No.: 11/667,861

(22) PCT Filed: Nov. 16, 2005

(86) PCT No.: PCT/JP2005/021392
§ 371 (c)(1),
(2), (4) Date: May 16, 2007

(87) PCT Pub. No.: WO2006/054754
PCT Pub. Date: May 26, 2006

(65) Prior Publication Data
US 2008/0097753 A1    Apr. 24, 2008

(30) Foreign Application Priority Data

Nov. 17, 2004  (JP) .................................. 2004-332540

(51) Int. Cl.
*H04L 9/32* (2006.01)
*H04M 11/00* (2006.01)
*H04M 1/64* (2006.01)

(52) U.S. Cl. ..................... 379/88.13; 379/69; 379/88.17; 379/88.25; 379/93.01; 713/178

(58) Field of Classification Search .................. 713/178; 379/88.02, 88.17, 88.25, 88.69, 88.7, 93.01, 379/88.13, 69
See application file for complete search history.

(56) References Cited

U.S. PATENT DOCUMENTS

| | | | | |
|---|---|---|---|---|
| 6,529,602 B1 * | 3/2003 | Walker et al. | .................. | 380/283 |
| 6,584,276 B2 * | 6/2003 | Ando et al. | .................... | 386/248 |
| 6,987,841 B1 * | 1/2006 | Byers et al. | ................. | 379/88.17 |

(Continued)

FOREIGN PATENT DOCUMENTS

JP    2002-125119    4/2002

(Continued)

*Primary Examiner* — Lisa Hashem
(74) *Attorney, Agent, or Firm* — McGinn IP Law Group, PLLC

(57) ABSTRACT

A time authentication system provided can detect an alteration of the case, in which either of the speakers of a conversation makes the alteration, and can verify, in the case of no alteration, that a conversation voice has occurred at a time within a range. When a speaker #1 terminal (2) and a speaker #2 terminal (3), i.e., all the speakers of the conversation request a time authentication station server (1) for the issue of a unique background sound which is difficult for those other than the time authentication station server (1) to estimate beforehand, the time authentication station server (1) issues the background sound and an electronic verification, which is electronically signed by adding a time stamp to the hash of the background sound, to the speaker #1 terminal (2) and the speaker #2 terminal (3). All the speakers of the conversation start the record of the conversation voice containing the background sound of all the speakers of the conversation, by using the speaker #1 terminal (2) and the speaker #2 terminal (3), mix and transmit their own voices while reproducing the background sound, end the record of the speech voice, and store the voice data.

15 Claims, 7 Drawing Sheets

U.S. PATENT DOCUMENTS

| | | | | |
|---|---|---|---|---|
| 7,379,659 B2 * | 5/2008 | Himeno et al. | | 386/239 |
| 7,558,221 B2 * | 7/2009 | Nelson et al. | | 370/260 |
| 7,861,088 B1 * | 12/2010 | Brothers | | 713/178 |
| 2003/0007611 A1 * | 1/2003 | Morita et al. | | 379/88.18 |
| 2003/0014380 A1 * | 1/2003 | Myers et al. | | 707/1 |
| 2003/0054802 A1 * | 3/2003 | Xie | | 455/412 |
| 2003/0115451 A1 * | 6/2003 | Walker et al. | | 713/153 |
| 2004/0192259 A1 * | 9/2004 | Xie | | 455/412.1 |
| 2005/0094626 A1 * | 5/2005 | Yoshihara | | 370/352 |
| 2007/0064905 A1 * | 3/2007 | Mizutani | | 379/207.03 |
| 2007/0263819 A1 * | 11/2007 | Finkelman et al. | | 379/201.11 |
| 2008/0268792 A1 * | 10/2008 | Munje | | 455/90.2 |
| 2009/0170482 A1 * | 7/2009 | Alessio et al. | | 455/414.1 |

FOREIGN PATENT DOCUMENTS

| | | | | |
|---|---|---|---|---|
| JP | 2004-158993 | | | 6/2004 |
| JP | 2004-172694 | | | 6/2004 |
| JP | 2004158993 | A | * | 6/2004 |
| JP | 2004-194306 | | | 7/2004 |

* cited by examiner

TIME AUTHENTICATION SYSTEM, TERMINAL DEVICE, TIME AUTHENTICATION METHOD FOR CONVERSATION VOICE DATA FOR USE THEREIN, AND PROGRAM THEREOF

TECHNICAL FIELD

This invention relates to a time authentication system, a terminal device, a time authentication method for conversation voice data for use therein, and a program thereof and, in particular, relates to a voice recording system for improving reliability of a time of a business transaction, such as ordering, by voice.

BACKGROUND ART

As business transactions of this type, there are conventionally, for example, transactions of stocks and bonds by telephone in stockbrokers, transactions by telephone of goods sold through television, radio, books, and so on, reservation transactions to lodging facilities and transport facilities by telephone, and so on. Since these are all the ordering by voice through telephone, voice recording systems are used for keeping the ordering records.

However, these voice recording systems each use a system internal timepiece or the like and, therefore, even if a voice recording time is altered on the recording side, it is not possible to prove the alteration of the voice recording time and thus the system is advantageous to the recording side.

In view of this, as a voice recording system of this type, there has been proposed offering of a service that improves reliability of a time of a business transaction such as ordering by voice, by recording the content of speech in a third-party service facility or issuing a digital certificate accompanied by time information (e.g. Japanese Unexamined Patent Application Publication (JP-A) No. 2004-172694 or Japanese Unexamined Patent Application Publication (JP-A) No. 2004-194306).

However, the foregoing conventional voice recording systems have a problem that even if a system user such as a stockbroker has altered conversation voice data before time authentication, it cannot be detected. Accordingly, the conventional voice recording systems have a problem that it is not possible to prove that no conversation voice is present before a certain time.

DISCLOSURE OF THE INVENTION

It is therefore an object of this invention to solve the foregoing problems and to provide a time authentication system that can detect an alteration when any of speakers in a conversation has made the alteration and that, in the case of no alteration, can verify that a conversation voice has occurred at a time within a certain range, a terminal device, a time authentication method for conversation voice data for use therein, and a program thereof.

A time authentication system according to this invention comprises a system that uses, as a recording time, a time authenticated by a time authentication authority when recording a call between a plurality of terminal devices each of which have a communication function.

The terminal devices each comprise means for requesting the time authentication authority to issue a unique background sound that is difficult for those other than said time authentication authority to conjecture beforehand, means for recording the call including background sounds of all speakers based on the background sound issued by the time authentication authority and an electronic certificate electronically signed by adding a time stamp to a hash of the background sound, means for performing transmission by mixing a voice to one's own terminal with the background sound while reproducing it, means for finishing recording the call and storing it as voice data, means for calculating a hash of the voice data and requesting the voice data time authentication of the time authentication authority, and means for storing an electronic certificate issued by the time authentication authority, the electronic certificate electronically signed by adding a time stamp to the hash of the voice data.

A terminal device according to this invention comprises a device having a voice communication function and adapted to use, as a recording time, a time authenticated by a time authentication authority when recording a call with another terminal device having a voice communication function.

The terminal device comprises means for requesting the time authentication authority to issue a unique background sound that is difficult for those other than the time authentication authority to conjecture beforehand, means for recording the call including background sounds of all speakers based on the background sound issued by the time authentication authority and an electronic certificate electronically signed by adding a time stamp to a hash of the background sound, means for performing transmission by mixing a voice to one's own terminal with the background sound while reproducing it, means for finishing recording the call and storing it as voice data, means for calculating a hash of the voice data and requesting the voice data time authentication of the time authentication authority, and means for storing an electronic certificate issued by said time authentication authority, said electronic certificate electronically signed by adding a time stamp to the hash of said voice data.

A time authentication method for conversation voice data according to this invention comprises a method for conversation voice data for use in a time authentication system that uses, as a recording time, a time authenticated by a time authentication authority when recording a call between a plurality of terminal devices each having a voice communication function.

The terminal devices each execute a step of requesting the time authentication authority to issue a unique background sound that is difficult for those other than the time authentication authority to conjecture beforehand, a step of recording the call including background sounds of all speakers based on the background sound issued by the time authentication authority and an electronic certificate electronically signed by adding a time stamp to a hash of the background sound, a step of performing transmission by mixing a voice to one's own terminal with the background sound while reproducing it, a step of finishing recording the call and storing it as voice data, a step of calculating a hash of the voice data and requesting the voice data time authentication of the time authentication authority, and a step of storing an electronic certificate issued by the time authentication authority, the electronic certificate electronically signed by adding a time stamp to the hash of the voice data.

A program of a time authentication method for conversation voice data according to this invention comprises a program for use in a time authentication system that uses, as a recording time, a time authenticated by a time authentication authority when recording a call between a plurality of terminal devices each having a voice communication function.

The program causes a computer of each of the terminal devices to execute a step of requesting the time authentication authority to issue a unique background sound that is difficult for those other than the time authentication authority to conjecture beforehand, a step of recording the call including background sounds of all speakers based on the background sound issued by the time authentication authority and an electronic certificate electronically signed by adding a time stamp to a hash of the background sound, a step of performing transmission by mixing a voice to one's own terminal with the background sound while reproducing it, a step of finishing recording the call and storing it as voice data, a step of calculating a hash of the voice data and requesting said voice data time authentication of the time authentication authority, and a step of storing an electronic certificate issued by the time authentication authority, the electronic certificate electronically signed by adding a time stamp to the hash of the voice data.

That is, the time authentication system of this invention makes it possible to provide a system which can verify that the conversation voice has occurred at a time within a certain range and that the recorded conversation voice is not altered.

In the time authentication system of this invention, all the speakers in a conversation each request the time authentication authority to issue a unique background sound that is difficult for those other than the time authentication authority to conjecture beforehand, the time authentication authority issues to each of the requesters the background sound and an electronic certificate electronically signed by adding a time stamp to a hash of the background sound, all the speakers in the conversation each start recording of conversation voices including the background sounds of all the speakers in the conversation, all the speakers in the conversation each mix one's own voice with the background sound while reproducing the background sound and transmit the mixture, all the speakers in the conversation each finish the recording of the conversation voices and store the voice data, all the speakers in the conversation each calculate a hash of the voice data and request the voice data time authentication of the time authentication authority, and the time authentication authority issues to each of the requesters a certificate electronically signed by adding a time stamp to the hash of the voice data.

Further, in the time authentication system of this invention, by performing reverberation mixing or nonlinear mixing of the conversation voices and the background sounds, it is made difficult to separate the recorded voice data into the background sounds and the conversation voices and then to alter the conversation voices and add the background sounds again.

Further, in the time authentication system of this invention, the time authentication authority issues identifiers that uniquely correspond to the background sounds, respectively, and are difficult for those other than the time authentication authority to conjecture beforehand, all the speakers in a conversation each communicate one's own identifier to the other speaker by voice at the last part of the conversation voice, and the other speaker makes confirmation by repeating it, thereby shortening a time available for alteration of the recorded voices to make the alteration more difficult.

Accordingly, in the time authentication system of this invention, it becomes possible to verify whether or not the recorded voice data is altered and, if not altered, it becomes possible to verify the occurrence of the recorded voice data from a certain time to another certain time.

According to this invention, with the structure and operation as will be described hereinbelow, there is obtained an effect that it is possible to detect an alteration when any of speakers in a conversation has made the alteration and, in the case of no alteration, it is possible to verify that a conversation voice has occurred at a time within a certain range.

BEST MODE FOR CARRYING OUT THE INVENTION

Next, a first embodiment of this invention will be described with reference to the drawings.

Figure 1:
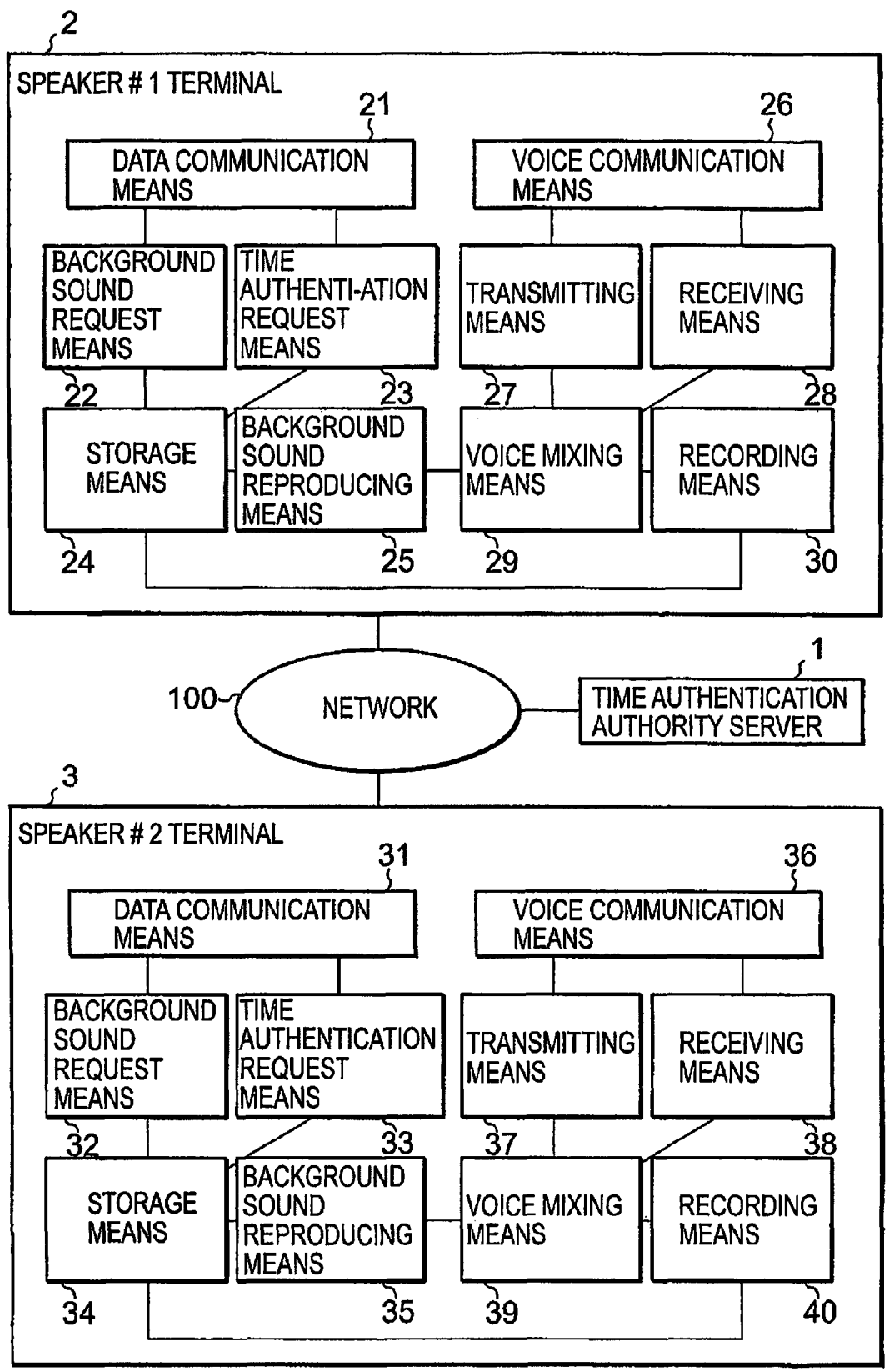
FIG. 1 is a block diagram showing the structure of a time authentication system according to an embodiment of this invention.

FIG. 1 is a block diagram showing the structure of a time authentication system according to the first embodiment of this invention. In FIG. 1, the time authentication system comprises a time authentication authority server 1, a speaker #1 terminal 2, a speaker #2 terminal 3, and a network 100 connecting them to each other.

The time authentication authority server 1 is an information processing apparatus such as a server computer and has a function of receiving a request for issue of a background sound from each of the terminal 2 used by a user, a party concerned, or a speaker #1 (referred to as the speaker #1 terminal 2) and the terminal 3 used by a user, a party concerned, or a speaker # (referred to as the speaker #2 terminal 3) and issuing the background sound and an electronic certificate time-authenticating the background sound and a function of receiving a request for time authentication of voice data from each of the speaker #1 terminal 2 and the speaker #2 terminal 3 and issuing an electronic certificate time-authenticating the voice data.

The speaker #1 terminal 2 and the speaker #2 terminal 3 are each an information processing apparatus such as a portable telephone, a fixed telephone, or a personal computer and each comprise data communication means 21, 31, background sound request means 22, 32, time authentication request means 23, 33, storage means 24, 34, background sound reproducing means 25, 35, voice communication means 26, 36, transmitting means 27, 37, receiving means 28, 38, voice mixing means 29, 39, and recording means 30, 40.

That is, the speaker #1 terminal 2 and the speaker #2 terminal 3 each have a function of performing a voice communication with another speaker, a function of transmitting a voice in the form of a mixture of one's own voice and a background sound, a function of mixing conversation voices including background sounds of one's own and another speaker and recording them, a function of requesting the time authentication authority server 1 to issue a background sound and acquiring background sound data and an electronic certificate time-authenticating the background sound data, and a function of requesting the recorded voice data time authentication of the time authentication authority server 10 and acquiring an electronic certificate time-authenticating the voice data.

When the speaker #1 terminal 2 or the speaker #2 terminal 3 requests the time authentication authority server 1 to issue a unique background sound that is difficult for those other than the time authentication authority server 1 to conjecture beforehand, the time authentication authority server 1 issues the background sound and an electronic certificate electronically signed by adding a time stamp to a hash of the background sound, to the speaker #1 terminal 2 or the speaker #2 terminal 3 being the requester. The background sound is determined on condition that a terminal and a time are specified. Accordingly, the background sound of the terminal 2 is determined at a time point when the authentication authority receives the request of the terminal 2 and, a change in the reception time point results in a different background sound. Likewise, the background sound of the terminal 3 is also caused to differ depending on the fact that the request is from the terminal 3 and a time of the request. The background sound may be determined by specifying a speaker and a time instead of determining it by specifying a terminal and a time.

The terminal 2 or 3 stores, in the storage means 24 or 34, data itself (a file, a bit string, musical performance codes, or the like) of the specific background sound sent from the authentication authority. The background sound data includes a length of the background sound and this length is a length enough to be assumed to be practically necessary for a conversation.

Using the speaker #1 terminal 2 or the speaker #2 terminal 3, all the speakers in the conversation each start recording of conversation voices including the background sounds of all the speakers in the conversation, mix one's own voice with the background sound while reproducing the background sound by accessing the storage means and transmit the mixture, then finish the recording of the conversation voices, and store the voice data. Further, using the speaker #1 terminal 2 or the speaker #2 terminal 3, all the speakers in the conversation each calculate a hash of the voice data and request the voice data time authentication of the time authentication authority server 1. The time authentication authority server 1 issues a certificate electronically signed by adding a time stamp to the hash of the voice data, to each of the speaker #1 terminal 2 and the speaker #2 terminal 3, that is, the requesters.

In each of the speaker #1 terminal 2 and the speaker #2 terminal 3, the voice mixing means 29 and 39 each perform reverberation mixing or nonlinear mixing of the conversation voices and the background sounds. Using such voice mixing means makes it difficult to separate the recorded voice data into the background sounds and the conversation voices and then to alter the conversation voices and add the background sounds again.

Therefore, in the embodiment of this invention, it is possible to verify whether or not the recorded voice data is altered and is further possible to verify the occurrence of the recorded voice data from a certain time to another certain time if there is no alteration of the recorded voice data.

The time authentication system according to the first embodiment will be further described with reference to sequence charts shown in FIGS. 2 and 3 along with the structure of FIG. 1. The processing shown in FIGS. 2 and 3 is realized through execution of programs recorded in the storage means 24 and 34 by non-illustrated CPUs (central processing units) in the speaker #1 terminal 2 and the speaker #2 terminal 3, respectively.

Figure 2:
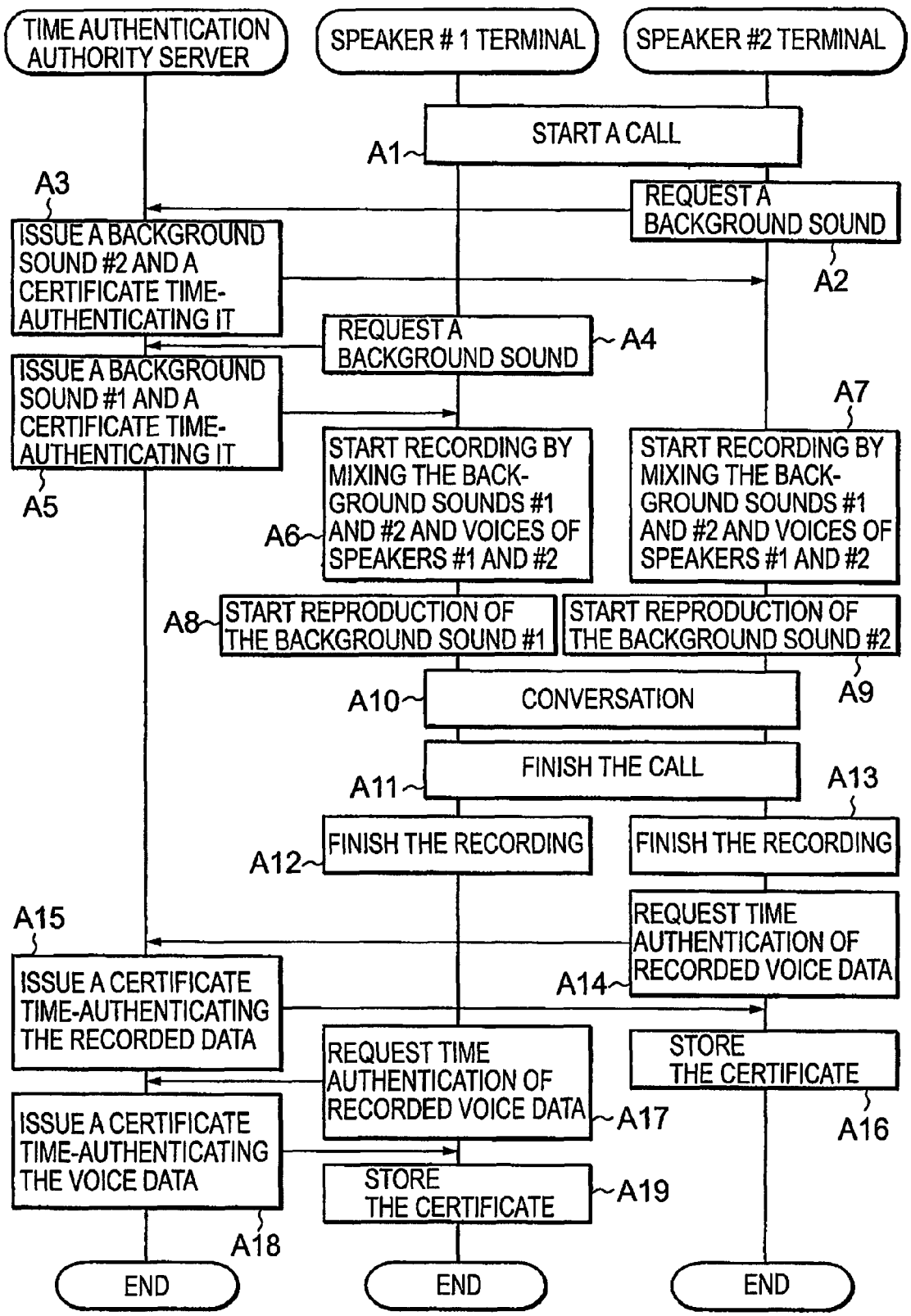
FIG. 2 is a sequence chart showing the operation of a time authentication system according to a first embodiment of this invention.
Figure 3:
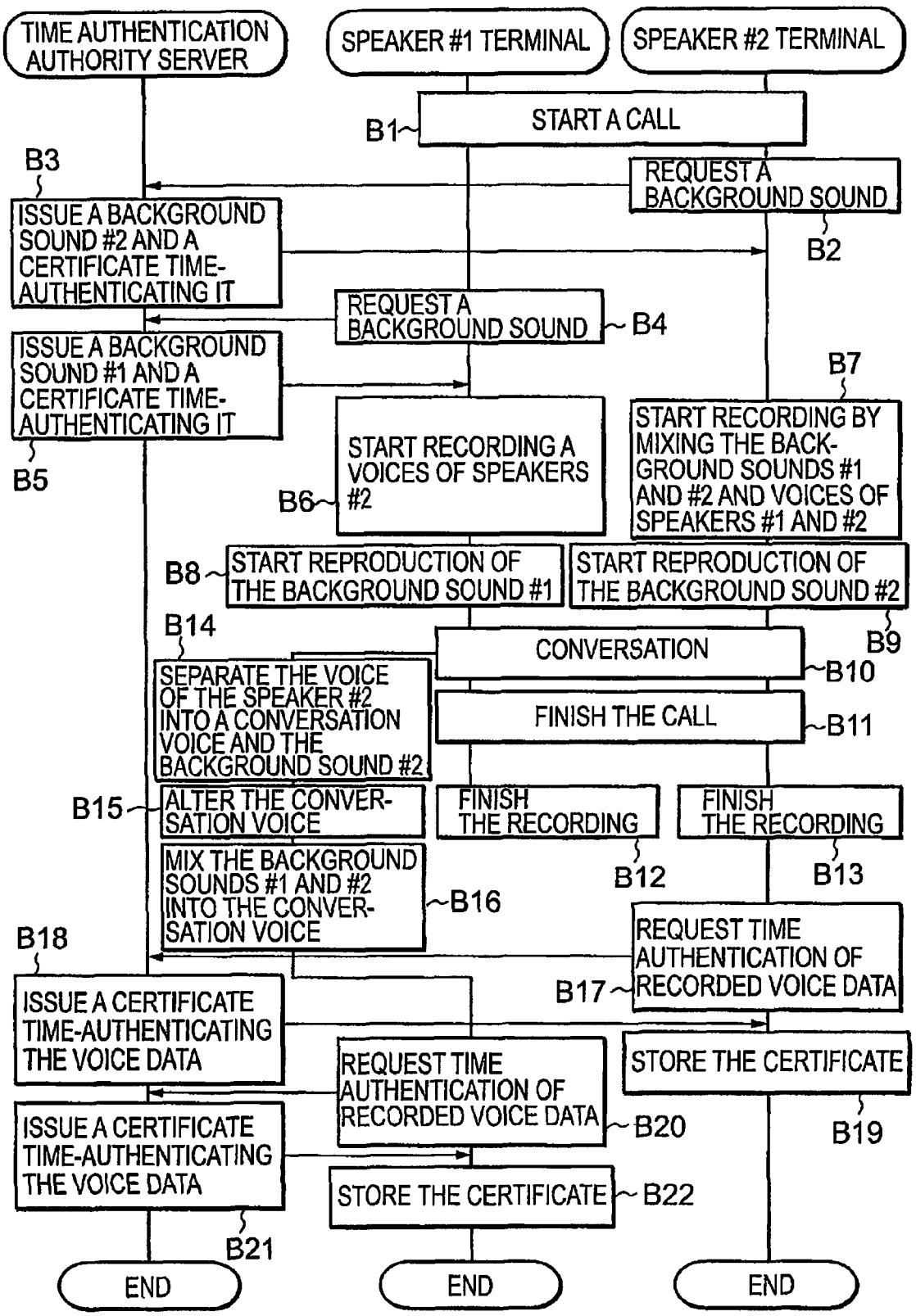
FIG. 3 is a sequence chart showing the operation when voice data is altered in the time authentication system according to the first embodiment of this invention.

First, the speaker #1 makes connection from the speaker #1 terminal 2 to the speaker #2 terminal 3 to start a call with the speaker #2 or the speaker #2 makes connection from the speaker #2 terminal 3 to the speaker #1 terminal 2 to start a call with the speaker #1 (FIG. 2, step A1).

The speaker #2 terminal 3 immediately requests the time authentication authority server 1 to issue a background sound having a necessary length (FIG. 2, step A2). Then, the time authentication authority server 1 immediately receives a request for issue of the background sound from the speaker #2 terminal 3, issues sound data of a unique background sound #2 for a specified time, which is difficult for those other than the time authentication authority server 1 to conjecture beforehand, and an electronic certificate electronically signed by adding a time stamp to a hash of the sound data of the background sound #2, and stores the request content and the issue content (FIG. 2, step A3). Simultaneously, the sound data of the background sound #2 and the electronic certificate are transferred to the speaker #2 terminal. The terminal 2 derives a hash value from the transferred sound data of the background sound, performs verification by comparing the harsh value with a hash value which is obtained by opening the electronic certificate using a public key of the authentication authority and, if the result is positive, stores the transferred sound data of the background sound in the storage means 34.

The speaker #1 terminal 2 immediately requests the time authentication authority server 1 to issue a background sound having a necessary length (FIG. 2, step A4). Then, the time authentication authority server 1 immediately receives a request for issue of the background sound from the speaker #1 terminal 2, issues sound data of a unique background sound #1 for a specified time, which is difficult for those other than the time authentication authority server 1 to conjecture beforehand, and an electronic certificate electronically signed by adding a time stamp to a hash of the sound data of the background sound #1, and stores the request content and the issue content (FIG. 2, step A5). Simultaneously, the sound data of the background sound #1 and the electronic certificate are transferred to the speaker #1 terminal. The sound data is stored in the storage means 24 after verification.

The speaker #1 terminal 2 immediately starts recording while mixing conversation voices of the speakers #1 and #2 including the background sound #2 (FIG. 2, step A6) and the speaker #2 terminal 3 immediately starts recording while mixing conversation voices of the speakers #1 and #2 including the background sound #2 (FIG. 2, step A7).

The speaker #1 terminal 2 immediately reproduces the background sound #1 and starts transmission while mixing it with a voice of the speaker #1 (FIG. 2, step A8) and the speaker #2 terminal 3 immediately reproduces the background sound #2 and starts transmission while mixing it with a voice of the speaker #2 (FIG. 2, step A9). Thereby, the speaker #1 and the speaker #2 have a conversation through the speaker #1 terminal 2 and the speaker #2 terminal 3 (FIG. 2, step A10).

When the speaker #1 disconnects communication with the speaker #2 terminal 3 using the speaker #1 terminal 2 to finish the call with the speaker #2 or when the speaker #2 disconnects communication with the speaker #1 terminal 2 using the speaker #2 terminal 3 to finish the call with the speaker #1 (FIG. 2, step A11), the speaker #1 terminal 2 immediately finishes the recording (FIG. 2, step A12) and the speaker #2 terminal 3 also immediately finishes the recording (FIG. 2, step A13).

The speaker #2 terminal 3 immediately transmits a hash of recorded voice data to the time authentication authority server 1 to request time authentication (FIG. 2, step A14). The time authentication authority server 1 immediately executes an electronic signature by adding a time stamp to the hash of the voice data and issues it to the speaker #2 terminal 3 (FIG. 2, step A15). The speaker #2 terminal 3 receives an electronic certificate of the voice data and stores it (FIG. 2, step A16).

The speaker #1 terminal 2 immediately transmits a hash of recorded voice data to the time authentication authority server 1 to request time authentication (FIG. 2, step A17). The time authentication authority server 1 immediately executes an electronic signature by adding a time stamp to the hash of the voice data and issues it to the speaker #1 terminal 2 (FIG. 2, step A18). The speaker #1 terminal 2 receives an electronic certificate of the voice data and stores it (FIG. 2, step A19).

As described above, in this embodiment, if there is no alteration in the recorded voice data, it is possible for the speaker #1 or the speaker #2 to know both the background sound #1 and the background sound #2 only after an authentication time of the background sound #1 or an authentication time of the background sound #2, whichever is later. Therefore, if the recorded voice data includes both the background sound #1 and the background sound #2, it is understood that the recorded voice data has occurred after the authentication time of the background sound #1 or the authentication time of the background sound #2, whichever is later. On the other hand, using the electronic certificate of the recorded voice data from the time authentication authority server 1, it is possible to verify the presence of the recorded voice data before an authentication time.

In this embodiment, if the recorded voice data is altered after the time authentication, the hash value of the recorded voice data changes and thus it is possible to judge the presence of the alteration.

Next, a description will be given of the case where recorded voice data is altered before time authentication thereof.

First, a description will be given of the case where a conversation voice other than one's own conversation voice is altered before time authentication of recorded voice data. Referring to FIG. 2, for example, in the case where the speaker #1 makes an alteration, since the speaker #2, that is, the conversation partner has the recorded voice data including the background sound of the speaker #2, which has been time-authenticated (FIG. 2, steps A14 to A16), it is possible to detect the alteration if forged recorded voice data includes no background sound of the speaker #2, is discontinuous, or includes an inconsistent portion.

Referring to FIG. 3, in order for the speaker #1 to make an alteration of voice data of the speaker #2 without trace, it is necessary to record a voice of the speaker #2 without mixing it with a voice of the speaker #1 and a background sound #1 (FIG. 3, step B6), separate a background sound #2 from the voice of the speaker #2 (FIG. 3, step B14), alter a conversation voice (FIG. 3, step B15), and mix the conversation voice after the alteration with the background sound #1 and the background sound #2 (FIG. 3, step B16). This calculation time is added to a time until an authentication time of the recorded voice data.

In the case of no alteration, a time required from a time when the issue of both the background sound #1 and the background sound #2 is completed (step B3 or step B5, whichever is later) to a time immediately before receiving time authentication (FIG. 3, step B21) is mostly occupied by a time of a conversation (FIG. 3, step B10) and a time required for requesting the time authentication of the recorded voice data (FIG. 3, step B20).

For example, forging recorded voice data of 10 minutes requires a background sound #2 of the same 10 minutes. For obtaining the background sound #2 of 10 minutes, it is necessary to perform the conversation (FIG. 3, step B10) for at least 10 minutes and, thereafter, a time is required for separating the background sound #2 and mixing the conversation voice after the alteration with the background sound #2 into (FIG. 3, steps B14 to B16). Normally, this time (FIG. 3, steps B14 to B16) becomes unignorably long as compared with the time required for the conversation (FIG. 3, step B10).

On the other hand, the time required for requesting the time authentication of the recorded voice data (FIG. 3, step B20) is substantially the same if a reproduction time corresponding to a recording time of the recorded voice data is the same. Accordingly, a margin time is determined that is shorter than the time required for separating the background sound #2 and mixing the conversation voice after the alteration with the background sound #2 (FIG. 3, steps B14 to B16) but is longer than the total of communication time delays and steps with short processing times and, if a time from the authentication time of the background sound #1 or the authentication time of the background sound #2, whichever is later, to the authentication time of the recorded voice data does not exceed a time derived by adding the margin time to the reproduction time of the recorded voice data, it is understood that no alteration is made.

By making it a rule that the time authentication authority denies time authentication exceeding the foregoing time limit afterwards in managing the time authentication system according to the embodiment of this invention, it is possible to prevent alteration by a speaker. Particularly, if reverberation mixing or nonlinear mixing, not instantaneous linear mixing, is performed to mix background sounds and speaker voices (FIG. 3, steps B8 and B9) in a terminal, it becomes extremely difficult to separate the background sound from the speaker voice other than one's own voice (FIG. 3, step B14) and thus it is possible to make an alteration practically impossible.

Next, a description will be given of the case where one's own conversation voice is altered before time authentication of recorded voice data. Referring to FIG. 2, the speaker #1 and the speaker #2 perform the same operations, which are symmetrical. Accordingly, for example, if the speaker #1 alters one's own voice data, there occurs a disagreement over the recorded voice data stored by the speaker #2. However, if the speaker #2 alters the voice data of the speaker #1, the alteration is detectable as described before and, therefore, if the speaker #2 makes no alteration of the voice data, it is possible to detect that the speaker #1 has altered one's own voice data.

As described above, in this embodiment, it is possible to detect whether or not the recorded voice data is altered and, if not altered, it is possible to verify the occurrence of the recorded voice data from a certain time to another certain time.

Next, a second embodiment of this invention will be described with reference to the drawings. The block structure of the second embodiment is substantially the same as that shown in FIG. 1, but the functions of the blocks and the operation of the system are somewhat different from those of the first embodiment.

In the second embodiment, the time authentication authority server 1 issues, to the speaker #1 terminal 2 and the speaker #2 terminal 3, background sounds and identifiers that uniquely correspond to the background sounds, respectively, and are difficult for those other than the time authentication authority server 1 to conjecture beforehand, all the speakers in a conversation each communicate one's own identifier to the other speaker by voice at the last part of a conversation voice, and the other speaker makes confirmation by repeating it, thereby shortening a time available for alteration of recorded voices to make the alteration more difficult.

Referring to the structure of FIG. 1 and sequence charts shown in FIGS. 4 to 7, the operation of the second embodiment will be described. The processing shown in FIGS. 4 to 7 is realized through execution of programs recorded in the storage means 24 and 34 by non-illustrated CPUs in the speaker #1 terminal 2 and the speaker #2 terminal 3, respectively.

Figure 4:
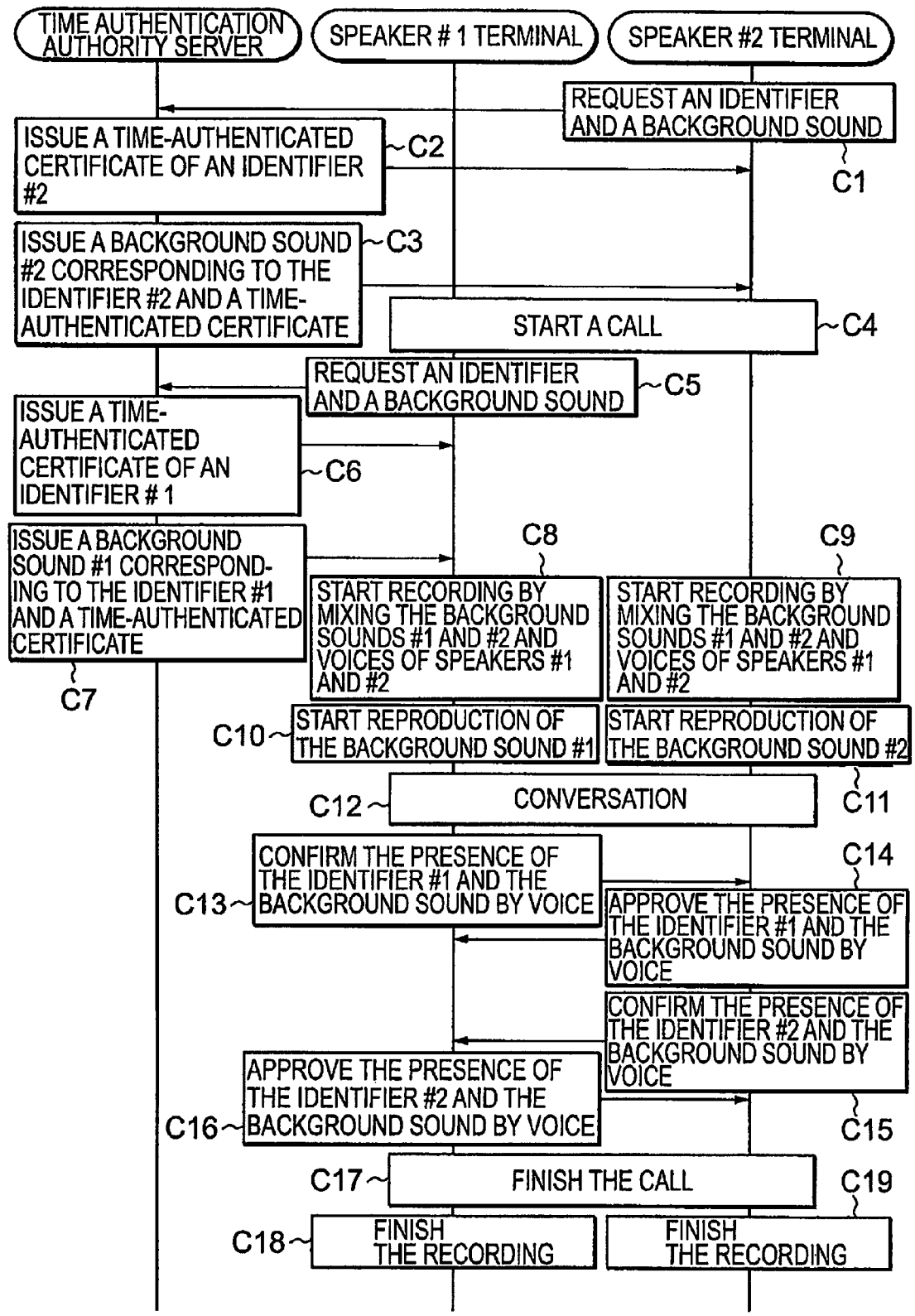
FIG. 4 is a sequence chart showing the operation of a time authentication system according to a second embodiment of this invention.

First, the speaker #2 terminal 3 requests the time authentication authority server 1 to issue a background sound having a necessary length and an identifier uniquely corresponding thereto (FIG. 4, step C1). The time authentication authority server 1 receives a request for issue of the background sound and the identifier from the speaker #2 terminal 3, issues an electronic certificate electronically signed by adding a time stamp to a unique identifier #2 that is difficult for those other than the time authentication authority server 1 to conjecture beforehand, and stores the request content and the issue content (FIG. 4, step C2). Simultaneously, the identifier #2 and the electronic certificate are transferred to the speaker #2 terminal.

The time authentication authority server 1 issues, to the speaker #2 terminal 3, sound data of a unique background sound #2 for a specified time, which uniquely corresponds to the identifier #2 and is difficult those for other than the time authentication authority server 1 to conjecture beforehand, and an electronic certificate electronically signed by adding a time stamp to a hash of the sound data of the background sound #2, and stores the request content and the issue content (FIG. 4, step C3). Simultaneously, the sound data of the background sound #2 and the electronic certificate are transferred to the speaker #2 terminal.

The speaker #1 makes connection from the speaker #1 terminal 2 to the speaker #2 terminal 3 to start a call with the speaker #2 or the speaker #2 makes connection from the speaker #2 terminal 3 to the speaker #1 terminal 2 to start a call with the speaker #1 (FIG. 4, step C4).

The speaker #1 terminal 2 immediately requests the time authentication authority to issue a background sound having a necessary length and an identifier uniquely corresponding thereto (FIG. 4, step C5). The time authentication authority server 1 immediately receives a request for issue of the background sound and the identifier from the speaker #1 terminal 2, issues an electronic certificate electronically signed by adding a time stamp to a unique identifier #1 that is difficult for those other than the time authentication authority server 1 to conjecture beforehand, and stores the request content and the issue content (FIG. 4, step C6). Simultaneously, the identifier #1 and the electronic certificate are transferred to the speaker #1 terminal.

The time authentication authority server 1 immediately issues, to the speaker #1 terminal 2, sound data of a unique background sound #1 for a specified time, which uniquely corresponds to the identifier #1 and is difficult for those other than the time authentication authority server 1 to conjecture beforehand, and an electronic certificate electronically signed by adding a time stamp to a hash of the sound data of the background sound #1, and stores the request content and the issue content (FIG. 4, step C7). Simultaneously, the sound data of the background sound #1 and the electronic certificate are transferred to the speaker #1 terminal.

Since the processing from step C8 to step C12 in FIG. 4 following the foregoing processing is the same as that of steps A6 to A10 in FIG. 2 in the foregoing first embodiment of this invention, explanation thereof is omitted.

When a conversation (FIG. 4, step C12) is finished, the speaker #1 terminal 2 immediately confirms, by voice, the presence of the identifier #1 and the background sound to the speaker #2 terminal 3 (FIG. 4, step C13). Then, the speaker #2 terminal 3 immediately repeats the identifier #1 to the speaker #1 terminal 2, thereby approving the presence of the background sound by voice (FIG. 4, step C15).

The speaker #2 terminal 3 immediately confirms, by voice, the presence of the identifier #2 and the background sound to the speaker #1 terminal 2 (FIG. 4, step C16). The speaker #1 terminal 2 immediately repeats the identifier #2 to the speaker #2 terminal 3, thereby approving the presence of the background sound by voice (FIG. 4, step C17).

Figure 5:
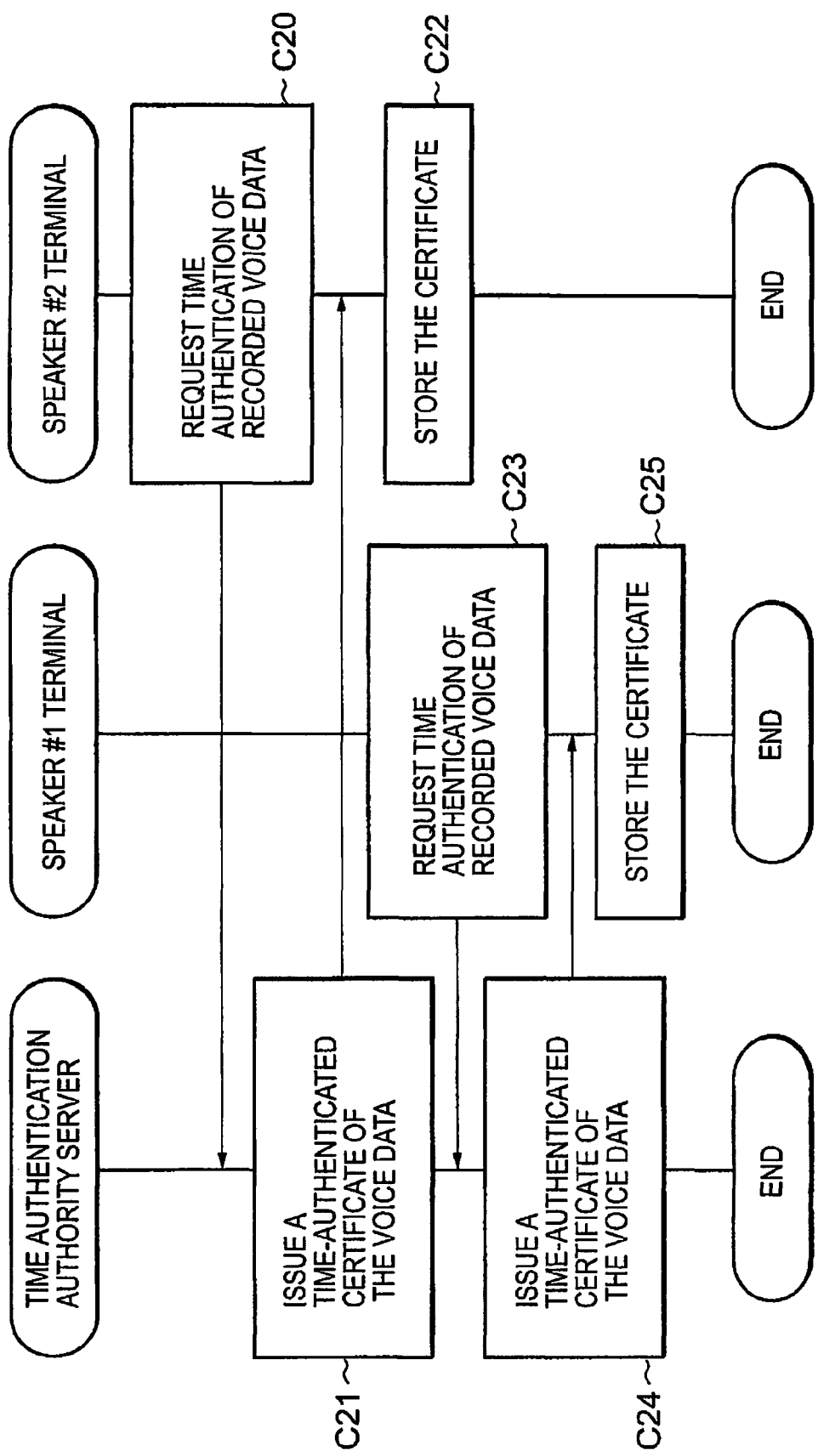
FIG. 5 is a sequence chart following the operation of the time authentication system shown in FIG. 4.

Since the subsequent processing from step C17 to step C19 in FIG. 4 and from step C20 to step C25 in FIG. 5 is the same as that of steps A11 to A19 in FIG. 2 in the foregoing first embodiment, explanation thereof is omitted.

Figure 6:
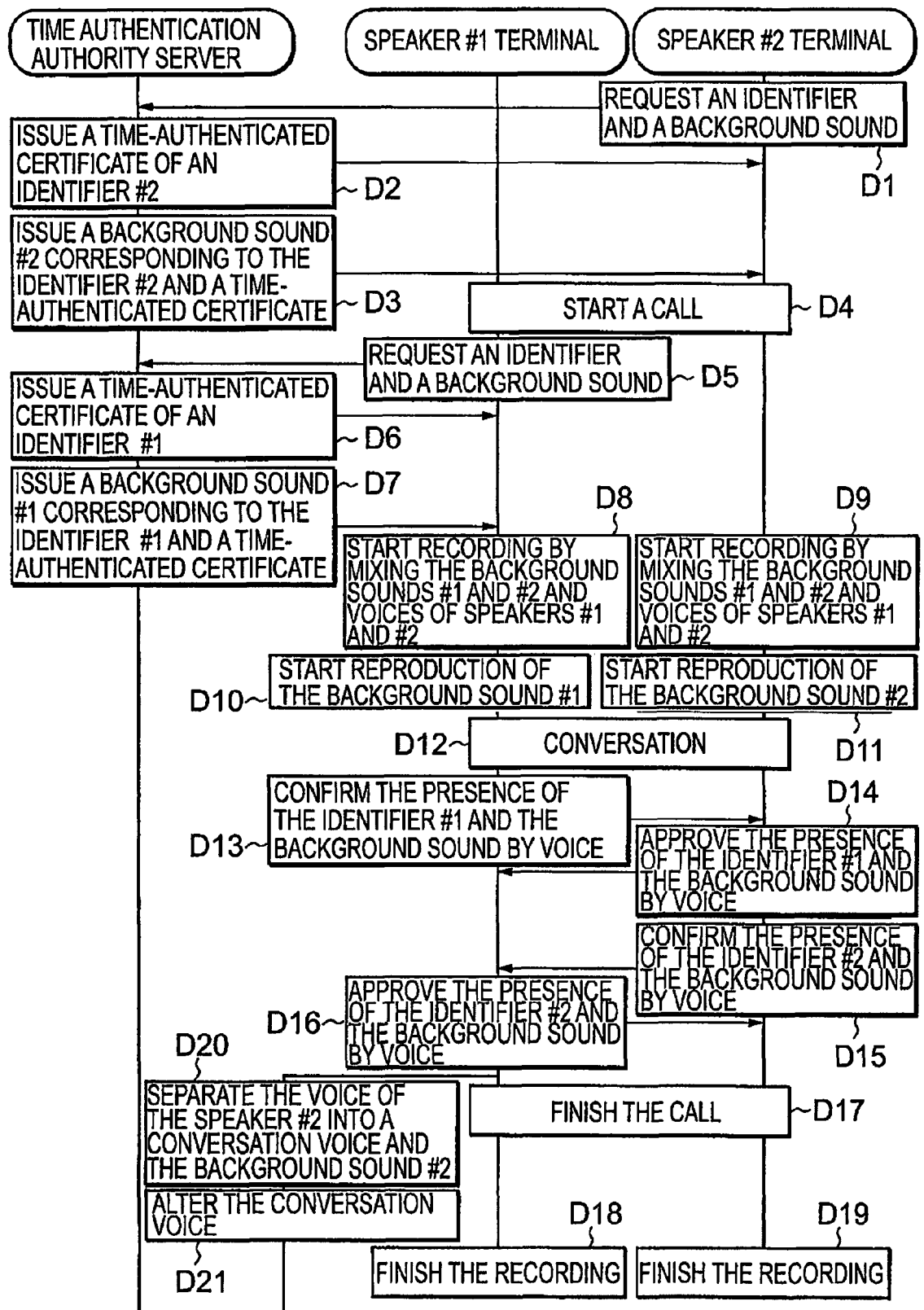
FIG. 6 is a sequence chart showing the operation when voice data is altered in the time authentication system according to the second embodiment of this invention.
Figure 7:
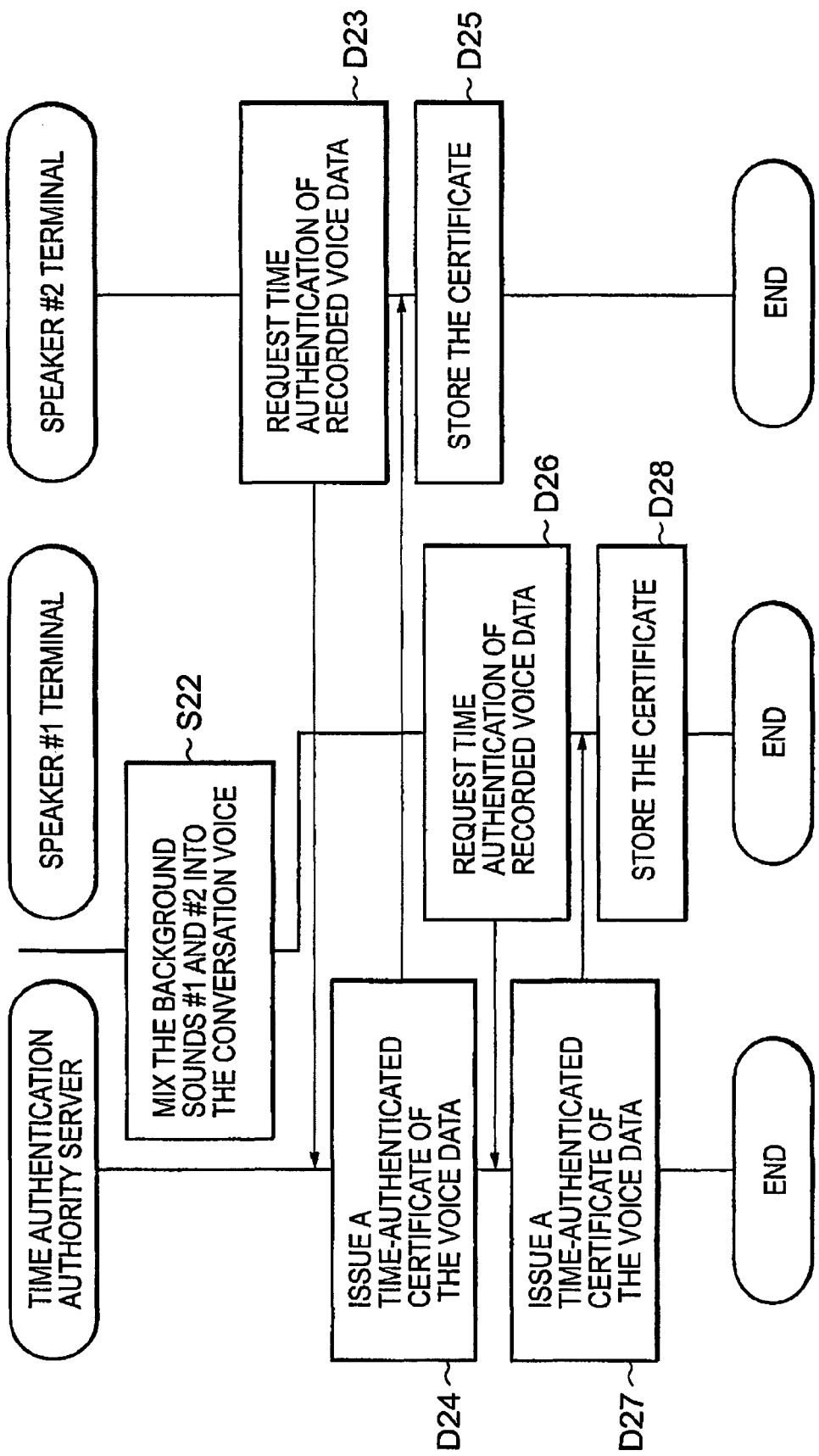
FIG. 7 is a sequence chart following the operation of the time authentication system shown in FIG. 6.

Referring to FIGS. 3, 6, and 7, the effect of the second embodiment will be described. In the first embodiment, the speaker #2 terminal 3 obtains a background sound (FIG. 3, steps B2 and B3) after the start of a call (FIG. 3, step B1) and thus is required to simultaneously perform voice communication and data communication.

On the other hand, in the second embodiment, the speaker #2 terminal 3 obtains a background sound #2 (FIG. 6, steps D1 to D3) before the start of a call (FIG. 6, step D4) and thus is not required to simultaneously perform voice communication and data communication.

Further, in the first embodiment, the separation of the background sound (FIG. 3, step B14) can be started at a time point when the background sound for a reproduction time of recorded voice data to be forged has been recorded during a conversation (FIG. 3, step B10).

On the other hand, in the second embodiment, the separation of the background sound (FIG. 6, step D20) cannot be started until a conversation (FIG. 6, step D12) and verbal confirmation of mutual identifiers (FIG. 6, steps D13 to D16) have been completed. In the second embodiment, it is possible to shorten a time available for separating the background sound and mixing the conversation voice after alteration with the background sound (FIG. 6, steps D20 and D21 and FIG. 7, step D22), thereby making the alteration more difficult.

By making it a rule, in managing the time authentication system of the second embodiment, that the time authentication authority server 1 denies, afterwards, recorded voice data which does not include the foregoing verbal confirmation of mutual identifiers at the last part of a conversation, it is possible to prevent alteration by a speaker.

Further, in the first embodiment, in order to identify the background sounds that should be included in the recorded voice data, it is necessary to refer to the background sound data itself stored by the speakers or the time authentication authority.

On the other hand, in the second embodiment, since the identifiers of the background sound data are included in the recorded voice data itself, it is not necessary to refer to the background sound data itself stored by the speakers or the time authentication authority for identifying the background sounds that should be included in the recorded voice data.

INDUSTRIAL APPLICABILITY

In this invention, each of the foregoing embodiments is applicable to time authentication of the communication content, time authentication of the content of on-line ordering through an operator, or time authentication of the proceedings content in an on-line conference.

The invention claimed is:

1. A time authentication system that uses, as a recording time, a time authenticated by a time authentication authority when recording a call between a plurality of terminal devices each having a voice communication function, wherein each terminal device of said plurality of terminal devices comprises:

means for requesting said time authentication authority to issue a unique background sound data that is determined by said time authentication authority when said time authentication authority receives a request, the unique background sound data being difficult for those other than said time authentication authority to conjecture beforehand;

means for storing the unique background sound data received from said time authentication authority and an electronic certificate electronically signed by adding a first time stamp to a hash of said unique background sound data;

means for reproducing a unique background sound from the unique background sound data;

means for mixing a voice to a terminal device of the plurality of terminal devices with the reproduced unique background sound to generate a mixed sound;

means for performing a transmission of the mixed sound to another terminal device of the plurality of terminal devices;

means for recording said call including voices of speakers and the unique background sound from the terminal and the another terminal;

means for storing said call as voice data when finishing recording said call;

means for calculating a hash of said voice data and requesting the time authentication of said voice data of said time authentication authority; and means for storing a second electronic certificate issued by said time authentication authority, said second electronic certificate electronically signed by adding a second time stamp to the hash of said voice data.

2. A time authentication system according to claim 1, wherein said plurality of terminal devices each perform any one of reverberation mixing and nonlinear mixing to said call and said unique background sound.

3. A time authentication system according to claim 2, wherein said plurality of terminal devices each communicate, by voice, an identifier issued by said time authentication authority, which uniquely corresponds to said unique background sound and is difficult for those other than said time authentication authority to conjecture beforehand, to an other terminal device of the plurality of terminal devices at last part of said call and confirm a repetition of said identifier from said other terminal device, thereby shortening a time available for alteration of a recorded voice.

4. A time authentication system according to claim 1, wherein said plurality of terminal devices each communicate, by voice, an identifier issued by said time authentication authority, which uniquely corresponds to said unique background sound and is difficult for those other than said time authentication authority to conjecture beforehand, to an other terminal device of the plurality of terminal devices at a last part of said call and confirm a repetition of said identifier from said other terminal device, thereby shortening a time available for alteration of a recorded voice.

5. A terminal device having a voice communication function and adapted to use, as a recording time, a time authenticated by a time authentication authority, when recording a call with another terminal device having a voice communication function, said terminal device comprising:

means for requesting said time authentication authority to issue a unique background sound data that is determined by said time authentication authority when said time authentication authority receives a request, the unique background sound data being difficult for those other than said time authentication authority to conjecture beforehand;

means for storing the unique background sound data received from said time authentication authority and a first electronic certificate electronically signed by adding a first time stamp to a hash of said unique background sound data;

means for reproducing a unique background sound from the unique background sound data;

means for mixing a voice to the terminal device with the reproduced unique background sound to generate a mixed sound;

means for performing a transmission of the mixed sound to the another terminal device;

means for recording said call including voices of speakers and the unique background sound from the terminal device and the another terminal device;

means for storing said call as voice data when finishing recording said call;

means for calculating a hash of said voice data and requesting the time authentication of said voice data of said time authentication authority; and means for storing a second electronic certificate issued by said time authentication authority, said second electronic certificate electronically signed by adding a second time stamp to the hash of said voice data.

6. A terminal device according to claim 5, further comprising performing one of reverberation mixing and nonlinear mixing to said call and said unique background sound.

7. A terminal device according to claim 6, further comprising:

communicating, by voice, an identifier issued by said time authentication authority, which uniquely corresponds to said unique background sound and is difficult for those other than said time authentication authority to conjecture beforehand, to said another terminal device at a last part of said call; and confirming a repetition of said identifier from said another terminal device, thereby shortening a time available for alteration of a recorded voice.

8. A terminal device according to claim 5, further comprising:

communicating, by voice, an identifier issued by said time authentication authority, which uniquely corresponds to said unique background sound data, to said another terminal device at a last part of said call; and confirming a repetition of said identifier from said another terminal device, thereby shortening a time available for alteration of a recorded voice.

9. A time authentication method for conversation voice data for use in a time authentication system that uses, as a recording time, a time authenticated by a time authentication authority when recording a call between a plurality of terminal devices each having a voice communication function, wherein, in said time authentication method for conversation voice data, said plurality of terminal devices each execute a method comprising:

requesting said time authentication authority to issue a unique background sound data that is determined by said time authentication authority when said time authentication authority receives a request, the unique background sound data being is difficult for those other than said time authentication authority to conjecture beforehand;

storing the unique background sound data received from said time authentication authority and a first electronic certificate electronically signed by adding a first time stamp to a hash of said unique background sound data;

reproducing a unique background sound from the unique background sound data;

mixing a voice to a terminal device of the plurality of terminal devices with the reproduced unique background sound to generate a mixed sound;

performing a transmission of the mixed sound to another terminal device of the plurality of terminal devices;

recording said call including voices of speakers and the unique background sound from the terminal device and the another terminal device;

storing said call as voice data when finishing recording said call;

calculating a hash of said voice data and requesting the time authentication of said voice data said time authentication authority; and storing a second electronic certificate issued by said time authentication authority, said second electronic certificate electronically signed by adding a second time stamp to the hash of said voice data.

10. A time authentication method for conversation voice data according to claim 9, wherein said plurality of terminal devices each perform any one of reverberation mixing and nonlinear mixing to said call and said unique background sound.

11. A time authentication method for conversation voice data according to claim 10, wherein said plurality of terminal devices each communicate, by voice, an identifier issued by said time authentication authority, which uniquely corresponds to said unique background sound and is difficult for those other than said time authentication authority to conjecture beforehand, to an other terminal device of the plurality of terminal devices at the last part of said call and confirm a repetition of said identifier from said other terminal device, thereby shortening a time available for alteration of a recorded voice.

12. A time authentication method for conversation voice data according to claim 9, wherein said plurality of terminal devices each communicate, by voice, an identifier issued by said time authentication authority, which uniquely corresponds to said unique background sound data, to an other terminal device of the plurality of terminal devices at a last part of said call and confirm a repetition of said identifier from said other terminal device, thereby shortening a time available for alteration of a recorded voice.

13. A non-transitory computer readable storage device for storing a program for a time authentication method for conversation voice data for use in a time authentication system that uses, as a recording time, a time authenticated by a time authentication authority when recording a call between a plurality of terminal devices each having a voice communication function, said program causing a computer of each terminal device of said plurality of terminal devices to execute an instruction control method, the method comprising:

requesting said time authentication authority to issue a unique background sound data that is determined by said time authentication authority when said time authentication authority receives a request, the unique background sound data being is difficult for those other than said time authentication authority to conjecture beforehand;

storing the unique background sound data received from said time authentication authority and a first electronic certificate electronically signed by adding a first time stamp to a hash of said unique background sound data;

reproducing a unique background sound from the unique background sound data;

mixing a voice to a terminal device of the plurality of terminal devices with the reproduced unique background sound to generate a mixed sound;

performing a transmission of the mixed sound to another terminal device of the plurality of terminal devices;

recording said call including voices of speakers and the unique background sound from the terminal device and the another terminal device;

storing said call as voice data when finishing recording said call;

calculating a hash of said voice data and requesting the time authentication of said voice data of said time authentication authority; and storing a second electronic certificate issued by said time authentication authority, said second electronic certificate electronically signed by adding a second time stamp to the hash of said voice data.

14. A voice recording system that uses, as a recording time, a time authenticated by a time authentication authority and records a call between a plurality of users, the voice recording system comprising:

first and second terminal devices adapted to be connected to each other through a network, wherein the first and second terminal devices each comprise:

means for requesting to said time authentication authority a unique background sound data that is determined by said time authentication authority when said time authentication authority receives a request, the unique background sound data being difficult for those other than said time authentication authority to conjecture beforehand;

means for storing the unique background sound data received from said time authentication authority and an electronic certificate electronically signed by adding a first time stamp to a hash of said unique background sound data;

means for reproducing a unique background sound from the unique background sound data;

means for mixing a voice to the first terminal with the reproduced unique background sound to generate a mixed sound;

means for performing a transmission of the mixed sound to the second terminal;

means for recording said call including voices of speakers and the unique background sound from the first terminal and the second terminal;

means for storing said call as voice data when finishing recording said call, means for calculating a hash of said voice data and requesting the time authentication of said voice data of said time authentication authority; and means for storing a second electronic certificate issued by said time authentication authority, said second electronic certificate electronically signed by adding a second time stamp to the hash of said voice data.

15. The time authentication system according to claim 14, wherein, when the recording of said call begins, the electronic certificate is electronically signed.

* * * * *